US005095322A

United States Patent [19]

Fletcher

[11] Patent Number: 5,095,322

[45] Date of Patent: Mar. 10, 1992

[54] AVOIDANCE OF DEP WRONG SIGN TONER HOLE CLOGGING BY OUT OF PHASE SHIELD BIAS

[75] Inventor: Gerald M. Fletcher, Pittsford, N.Y.

[73] Assignee: Xerox Corporation, Stamford, Conn.

[21] Appl. No.: 596,146

[22] Filed: Oct. 11, 1990

[51] Int. Cl.[5] .............. G01D 15/06

[52] U.S. Cl. .............. 346/159; 346/153.1

[58] Field of Search .............. 346/153.1, 154, 155, 346/159, 160.1

[56] References Cited

U.S. PATENT DOCUMENTS

| | | | |
|---|---|---|---|
| 3,689,935 | 9/1972 | Pressman et al. | 346/74 ES |
| 4,491,855 | 1/1985 | Fuji et al. | 346/159 |
| 4,568,955 | 2/1986 | Hosoya et al. | 346/153.1 |
| 4,647,179 | 3/1987 | Schmidlin | 355/3 DD |
| 4,743,926 | 5/1988 | Schmidlin et al. | 346/159 |
| 4,755,837 | 7/1988 | Schmidlin et al. | 346/155 |
| 4,814,796 | 3/1989 | Schmidlin | 346/155 |
| 4,860,036 | 8/1989 | Schmidlin | 346/159 |
| 4,903,049 | 2/1990 | Sotack | 346/159 |
| 4,912,489 | 3/1990 | Schmidlin | 346/159 |

*Primary Examiner*—Benjamin R. Fuller
*Assistant Examiner*—Randy W. Gibson

[57] ABSTRACT

A non-contact printing device in the form of a Direct Electrostatic Printer (DEP) which is not plagued by aperture clogging and which is well suited for use with a plain paper image receiver. The DEP device includes a supply of toner, an apertured printhead structure and a backing electrode. The printhead structure includes a shield electrode structure and control electrode structure supported by an insulating base member such that the shield electrode structure faces the toner supply. Voltages applied to the toner supply, control electrode, shield electrode and backing electrode effect deposition of toner in image configuration on an image receiver. A pulsed bias is applied to the shield electrode for causing wrong sign toner to deposit thereon instead of the control electrode structure. The natural AC jumping of toner occurring between the toner supply device and the shield electrode structure prevents buildup of toner particles around the printhead apertures.

6 Claims, 1 Drawing Sheet

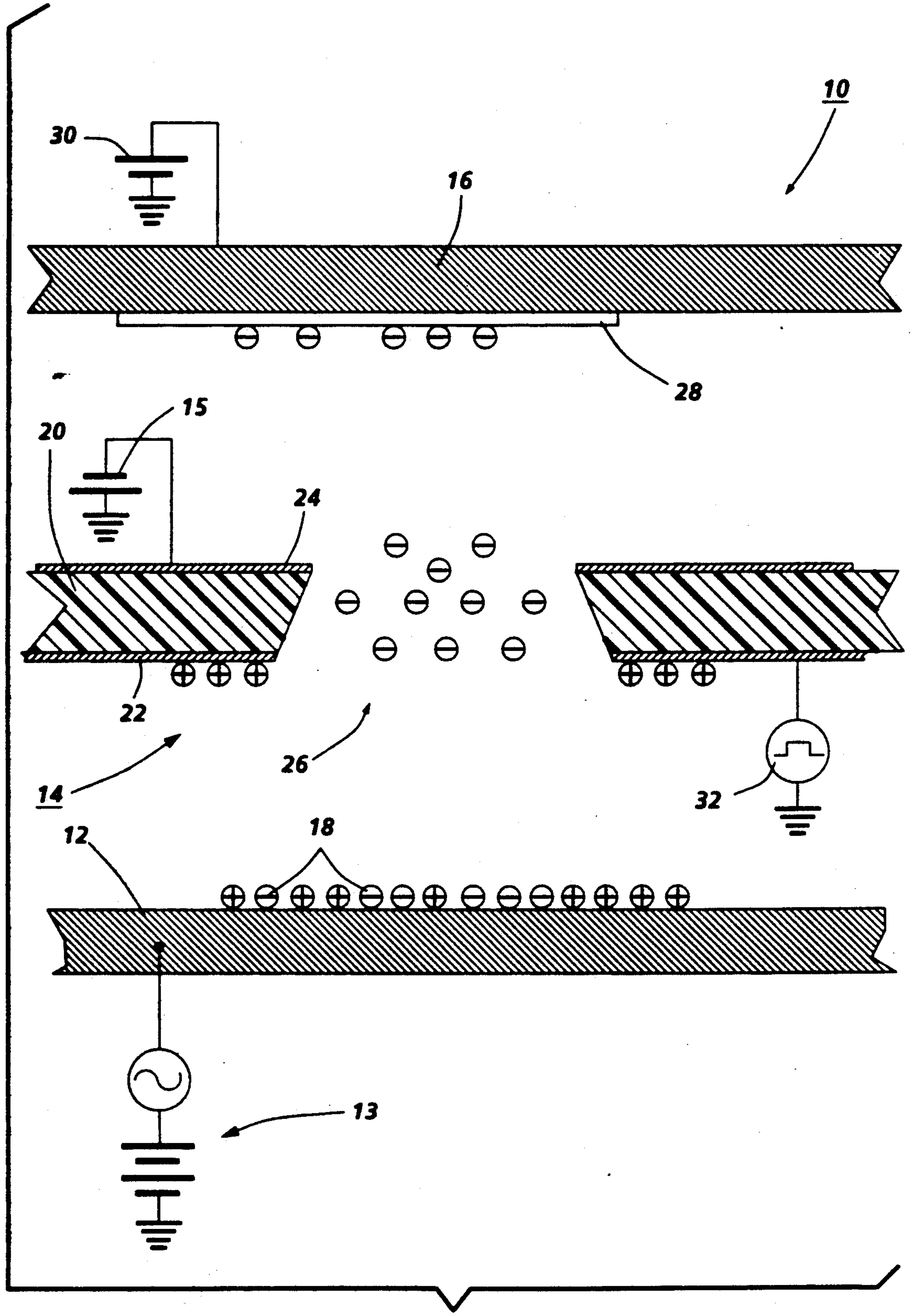
THE FIG.

AVOIDANCE OF DEP WRONG SIGN TONER HOLE CLOGGING BY OUT OF PHASE SHIELD BIAS

BACKGROUND OF THE INVENTION

This invention relates to electrostatic printing devices and more particularly to non-impact printing devices which utilize electronically addressable printheads for depositing developer in image configuration on plain paper substrates.

Of the various electrostatic printing techniques, the most familiar and widely utilized is that of xerography wherein latent electrostatic images formed on a charge retentive surface are developed by a suitable toner material to render the images visible, the images being subsequently transferred to plain paper.

A lesser known form of electrostatic printing is one that has come to be known as Direct Electrostatic Printing (DEP). This form of printing differs from the aforementioned xerographic form, in that, the toner or developing material is deposited directly onto a plain (i.e. not specially treated) substrate in image configuration. This type of printing device is disclosed in U.S. Pat. No. 3,689,935 issued Sept. 5, 1972 to Gerald L. Pressman et al. In general, this type of printing device uses electrostatic fields associated with addressable electrodes for allowing passage of developer material through selected apertures in a printhead structure. Additionally, electrostatic fields are used for attracting developer material to an imaging substrate in image configuration.

Pressman et al disclose an electrostatic line printer incorporating a multilayered particle modulator or printhead comprising a layer of insulating material, a continuous layer of conducting material on one side of the insulating layer and a segmented layer of conducting material on the other side of the insulating layer. At least one row of apertures is formed through the multilayered particle modulator. Each segment of the segmented layer of the conductive material is formed around a portion of an aperture and is insulatively isolated from every other segment of the segmented conductive layer. Selected potentials are applied to each of the segments of the segmented conductive layer while a fixed potential is applied to the continuous conductive layer. An overall applied field projects charged particles through the row of apertures of the particle modulator and the density of the particle stream is modulated according to the pattern of potentials applied to the segments of the segmented conductive layer. The modulated stream of charged particles impinge upon a print-receiving medium interposed in the modulated particle stream and translated relative to the particle modulator to provide line-by-line scan printing. In the Pressman et al device the supply of the toner to the control member is not uniformly effected and irregularities are liable to occur in the image on the image receiving member. High-speed recording is difficult and moreover, the openings in the printhead are liable to be clogged by the toner.

U.S. Pat. No. 4,491,855 issued on Jan. 1, 1985 in the name of Fuji et al discloses a method and apparatus utilizing a controller having a plurality of openings or slit-like openings to control the passage of charged particles and to record a visible image of charged particles directly on an image receiving member. Specifically, disclosed therein is an improved device for supplying the charged particles to a control electrode that has allegedly made high-speed and stable recording possible. The improvement in Fuji et al lies in that the charged particles are supported on a supporting member and an alternating electric field is applied between the supporting member and the control electrode. Fuji et al purports to obviate at least some of the problems noted above with respect to Pressman et al. Thus, Fuji et al alleges that their device makes it possible to sufficiently supply the charged particles to the control electrode without scattering them.

U.S. Pat. No. 4,568,955 issued on Feb. 4, 1986 to Hosoya et al discloses a recording apparatus wherein a visible image based on image information is formed on an ordinary sheet by a developer. The recording apparatus comprises a developing roller spaced at a predetermined distance from and facing the ordinary sheet and carrying the developer thereon. It further comprises a plurality of addressable recording electrodes and corresponding signal sources connected thereto for attracting the developer on the developing roller to the ordinary sheet by generating an electric field between the ordinary sheet and the developing roller according to the image information. A plurality of mutually insulated electrodes are provided on the developing roller and extend therefrom in one direction. A.C. and D.C. voltage sources are connected to the electrodes, for generating alternating electric fringe fields between adjacent ones of the electrodes to cause oscillations of the developer positioned between the adjacent electrodes along electric lines of force therebetween to thereby liberate the developer from the developing roller.

Direct electrostatic printing (DEP) structures are particularly attractive due to reduced manufacturing cost and increased reliability opportunities in non-impact electronic printing. DEP printing systems which utilize apertured printhead structures such as those of Pressman et al and Fuji et al have the potential problem of reduced performance due to aperture clogging. Aperture clogging is caused by wrong sign toner accumulating on the control electrode structure of the apertured printhead structure. A typical printhead structure comprises a shield electrode structure and a control electrode structure which are supported on opposite sides of an insulating member. The printhead structure together with a suitable supply of toner particles and appropriate electrical bias voltages are usually arranged such that the shield electrode structure faces the toner supply.

The problem of aperture clogging through accumulation of wrong sign toner particles on the control electrode structure is addressed in a number of patents. Generally, the problem is solved by minimizing the amount of wrong sign toner in the toner supply or by the provision of structure for cleaning or removing toner from the control electrode structure.

U.S. Pat. No. 4,743,926 granted to Schmidlin et al on May 10, 1988 and assigned to the same assignee as the instant invention discloses an electrostatic printing apparatus including structure for delivering developer or toner particles to a printhead forming an integral part of the printing device. Alternatively, the toner particles can be delivered to a charge retentive surface containing latent images. The developer or toner delivery system is adapted to deliver toner containing a minimum quantity of wrong sign and size toner. To this end, the developer delivery system includes a pair of charged toner conveyors which are supported in face-to-face relation. A bias voltage is applied across the two conveyors to cause toner of one charge polarity to be attracted to one of the conveyors while toner of the opposite is attracted to the other conveyor. One of charged toner conveyors delivers toner of the desired polarity to an apertured printhead where the toner is attracted to various apertures thereof from the conveyor.

In another embodiment of the '926 patent a single charged toner conveyor is supplied by a pair of three-phase generators which are biased by a DC source which causes toner of one polarity to travel in one direction on the electrode array while toner of the opposite polarity travels generally in the opposite direction.

In an additional embodiment disclosed in the '926 patent, a toner charging device is provided which charges uncharged toner particles to a level sufficient for movement by one or the other of the aforementioned charged toner conveyors.

U.S. Pat. No. 4,814,796 granted to Fred W. Schmidlin on Mar. 3, 1989 and assigned to the same assignee as the instant invention discloses a direct electrostatic printing apparatus including structure for delivering developer or toner particles to a printhead forming an integral part of the printing device. The printing device includes, in addition to the printhead, a conductive shoe which is suitably biased during a printing cycle to assist in the electrostatic attraction of developer through apertures in the printhead onto the copying medium disposed intermediate the printhead and the conductive shoe. The structure for delivering developer or toner is adapted to deliver toner containing a minimum quantity of wrong sign toner. To this end, the developer delivery system includes a conventional magnetic brush which delivers toner to a donor roll structure which, in turn, delivers toner to the vicinity of apertures in the printhead structure.

U.S. Pat. No. 4,755,837 granted to Fred W. Schmidlin on July 5, 1988 and assigned to the same assignee as the instant invention discloses a direct electrostatic printing apparatus including structure for removing wrong sign developer particles from a printhead forming an integral part of the printing device. The printing device includes, in addition to the printhead, a conductive shoe which is suitably biased during a printing cycle to assist in the electrostatic attraction of developer passing through apertures in the printhead onto the copying medium disposed intermediate the printhead and the conductive shoe. During a cleaning cycle, the printing bias is removed from the shoe and an electrical bias suitable for creating an oscillating electrostatic field which effects removal of toner from the printhead is applied to the shoe.

U.S. Pat. No. 4,912,489 discloses a Direct Electrostatic Printing device comprising a printhead structure comprising a shield electrode structure and a control electrode structure supported by an insulative support member. The printhead structure is positioned such that the control electrode is opposite the toner supply. Wrong sign toner accumulates on the control electrode.

BRIEF DESCRIPTION OF THE INVENTION

Briefly, the present invention provides a non-contact printing device in the form of a Direct Electrostatic Printer wherein the problem of wrong sign toner deposition on the control electrode structure is minimized.

To this end, there is provided a printhead structure comprising a conductive shield electrode structure and a control electrode structure which are supported on opposite sides of an insulative support member. A device for supplying toner particles is positioned such that it is opposite the shield electrode stucture. An AC voltage applied to the toner supply member effects toner movement to the printhead structure. Toner is moved through selected apertures of the printhead structure through appropriate biases being applied to control associated with certain of the printhead apertures.

A pulsed DC or DC biased AC voltage is applied to the shield electrode structure. The voltage applied to the shield electrode structure is at the same frequency as the AC voltage applied to the toner supply but is approximately 180° out of phase therewith. During the half cycle of the AC applied to the toner supply that directs right sign toner away from the toner supply region and toward the shield and control electrodes, the shield voltage can be substantially the same as the condition that would be present without a pulsed DC voltage applied to the shield. This will reduce the effect of the pulsed voltage on the flow of right sign toner to be directed through the shield and control electrode regions. When the control electrode potential is turned to the "on" state. During the half cycle of the AC applied to the toner supply that directs wrong sign toner away from the toner supply region and toward the shield and control electrodes, the pulsed voltage applied to the shield electrode structure reduces the potential difference and thus the fringe field between the shield and the control electrode. In addition, it increases the field driving wrong sign toner toward the shield. This causes more wrong sign toner to be attracted to the shield electrode structure which is on the toner supply side of the printer, and less wrong sign toner to be attracted to the control electrode. The natural AC jumping of the toner occuring between the toner supply device and the shield electrode structure prevents buildup of toner particles around the printhead apertures. Thus, the present materials/process requirement of very low wrong sing toner for Direct Electrostatic Printing are relieved.

DETAILED DESCRIPTION OF THE DRAWINGS

The Figure is a schematic illustration of a printing apparatus incorporating the present invention.

DETAILED DESCRIPTION OF THE PREFERRED EMBODIMENT OF THE INVENTION

Disclosed in the Figure is an embodiment of a Direct Electrostatic Printing (DEP) apparatus 10 incorporating the invention.

The printing apparatus 10 includes a developer delivery or conveying system generally indicated by reference character 12, a printhead structure 14 and a backing electrode structure 16.

As disclosed herein, the developer delivery system 12 comprises a donor roll structure. The donor roll structure which is preferably coated with Teflon-S (Trademark of E.I. duPont) is spaced from the printhead approximately 0.003 to 0.015 inch. Teflon-S is a tetrafluoroethylene fluorocarbon polymer that is loaded with carbon black. Alternately, developer delivery system 12 may comprise any other suitable device know in the art. For example, it may comprise a Toner Cloud Development (T.C.D) system of the type disclosed in U.S. Pat.

No. 4,647,179. The primary purpose of the delivery system is to effect delivery of toner particles 18 to the printhead structure 14.

The developer preferably comprises any suitable insulative non-magnetic toner/carrier combination having Aerosil (Trademark of Degussa, Inc.) contained therein in an amount equal to ½% by weight and also having zinc stearate contained therein in an amount equal to 1% by weight. The toner 18 may be charged positively or negatively. Purposes of this disclosure it is assumed that the toner is negatively charged.

The printhead structure 14 comprises a layered member including an electrically insulative base member 20 which may be fabricated from a polyimide film approximately 0.001 inch thick. The base member may be clad on the one side thereof with a continuous conductive electrode structure or shield 22 of aluminum which is approximately one micron thick. The opposite side of the base member 20 may carry a segmented conductive control electrode structure 24 thereon which is fabricated from aluminum. The printhead structure 14 is positioned in the printing device such that the shield electrode structure 22 faces the donor roll structure 12.

A plurality of holes or apertures 26 (only one of which is shown) approximately 0.007 inch in diameter are provided in the layered member in a pattern suitable for use in recording information. The apertures form an electrode array of individually addressable electrodes. A preferred aperture array is disclosed in U.S. Pat. No. 4,860,036, incorporated herein by reference. The '036 patent was granted to Fred W. Schmidlin on Aug. 22, 1989.

Movement of the charged toner to the printhead structure is effected through the application of a DC biased AC peak voltage of about 550 volts with a DC bias of +40 volts. This bias is provided via voltage source 13.

With a voltage applied to shield in accordance with the present invention and zero volts applied to an addressable electrode, toner 18 is propelled through the aperture associated with that electrode. The apertures extends through the base 20 and the conductive layers 22 and 24.

With a negative 350 volts applied to an addressable electrode via voltage source 15, toner is prevented from being propelled through the aperture. Image intensity can be varied by adjusting the voltage on the control electrodes between 0 and minus 350 volts. Addressing of the individual electrodes can be effected in any well known manner know in the art of printing using electronically addressable printing elements.

The addressing of the electrodes is synchronized with the arrival of a copy substrate 28 adjacent the apertures. A suitable substrate sensor (not shown) is used for detection of the copy substrate 28. The outpu signal from the sensor is transmitted to a controller (not shown) to initiate addressing of the apporpriate control electrodes.

The electrode or shoe 16 preferably has an arcuate shape but as will be appreciated, the present invention is not limited by such a configuration. The shoe 16 which is positioned on the opposite side of the plain paper copy substrate 28 from the printhead deflects the recording substrate in order to provide an extended area of contact between the medium and the shoe.

The substrate or recording medium 28 may comprise cut sheets of paper fed from a supply tray (not shown). The sheets of paper are spaced from the printhead 12 a distance in the order of 0.005 to 0.030 inch as they pass therebetween. The sheets 58 are transported in contact with the shoe 16 via edge transport roll pairs 100.

During printing the shoe 16 is electrically biased to a DC potential of approximately +300 volts via a DC voltage source 30 for the purpose of attracting the toner particles moved through the apertures.

In accordance with the present invention, a pulsed DC or DC biased AC voltage is applied to the shield electrode structure 22 via voltage source 32. The voltage applied to the shield electrode structure is at the same frequency as the AC voltage applied to the toner supply but is approximately 180° out of phase therewith. The pulsed DC voltage is negative to coincide with the positive cycle of the AC voltage applied to the donor roll thereby establishing an electrostatic field about the shield electrode structure. Thus, the voltage applied to the shield electrode structure reduces the fringe field between the shield and control electrodes and increases the field between the toner supply and the shield. This causes wrong sign toner to be attracted to the shield electrode structure which is on the toner supply side of the printer rather than to the control electrode side of the printer. The natural AC jumping of toner occurring between the toner supply device and the shield electrode structure prevents buildup of toner particles around the printhead apertures. Thus, the present materials/process requirements of very low wrong sing toner for Direct Electrostatic Printing are relieved.

What is claimed is:

1. Direct electrostatic printing apparatus, said apparatus comprising:

a supply of toner containing right and wrong sign particles;

a conductive shield electrode structure;

a control electrode structure;

an insulative member supporting said conductive shield structure and said control electrode structure, said conductive shield structure, said control electrode structure and said insulative supporting member forming an apertured printhead structure positioned such that said conductive shield electrode structure faces said supply of toner;

means for establishing an electrostatic field between said supply of toner and said printhead structure for moving toner particles from said supply toward said printhead structure;

means for effecting movement of said toner particles through selected apertures of said printhead structure; and means for effecting deposition of wrong sign toner particles on said conductive shield structure whereby passage of wrong sign toner particles through said apertures and deposition thereof on said control electrode structure are minimized;

said means for establishing an electrostatic field between said supply of toner particles and said printhead structure comprises means for applying an AC voltage to said means for supplying toner and wherein said meand for minimizing deposition of toner particles on said control electrode structure comprises electrical bias means for intermittently applying a bias voltage to said conductive shield electrode structure.

2. Apparatus according to claim 1 wherein said electrical bias means comprises a pulsed DC voltage which approximately 180° out of phase with AC voltage applied to said toner supply means.

3. Apparatus according to claim 1 wherein said electrical bias means comprises a DC biased AC voltage source approximately 180° out of phase with AC voltage applied to said toner supply means.

4. A method of printing toner images directly on an image receiver including the steps of:

providing a supply of toner containing right and wrong sign particles;

supporting a printhead structure comprising a conductive shield electrode structure a control electrode structure and an insulative member adjacent said supply of toner such that said conductive shield structure faces said supply of toner;

establishing an electrostatic field between said supply of toner and said printhead structure for moving toner particles from said supply in the direction of said printhead structure;

effecting movement of said toner particles through selected apertures of said printhead structure; and effecting deposition of said wrong sign toner particles on said conductive shield electrode structure for minimizing passage of said wrong sign toner particles through said apertures and deposition thereof on said control electrode structure;

said step of establishing an electrostatic field between said supply of toner particles and said printhead structure comprises means for applying an AC voltage to said means for supplying toner and wherein said step of minimizing deposition of toner particles on said control electrode structure comprises electrical bias means for intermittently applying a bias voltage to said conductive shield electrode structure.

5. The method according to claim 4 wherein said step of minimizing deposition of said toner particles comprises applying a pulsed DC voltage which is approximately 180° out of phase with the AC voltage applied to said toner supply means.

6. The method according to claim 4 wherein said step of minimizing deposition of said toner particles comprises applying an DC biases AC voltage source which is approximately 180° out of phase with the AC voltage applied to said toner supply means.

* * * * *